Nov. 12, 1968 W. KELLY ET AL 3,410,523
FLUID VALVE HAVING LOW WEAR AND WEAR-COMPENSATION
CHARACTERISTICS
Filed Oct. 27, 1965 2 Sheets-Sheet 1
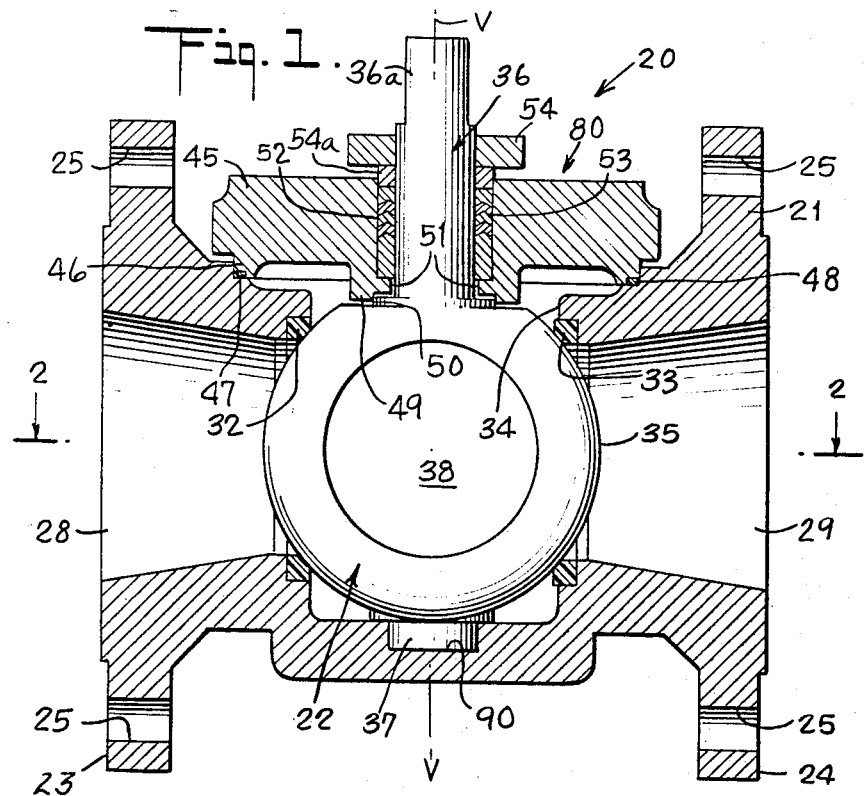
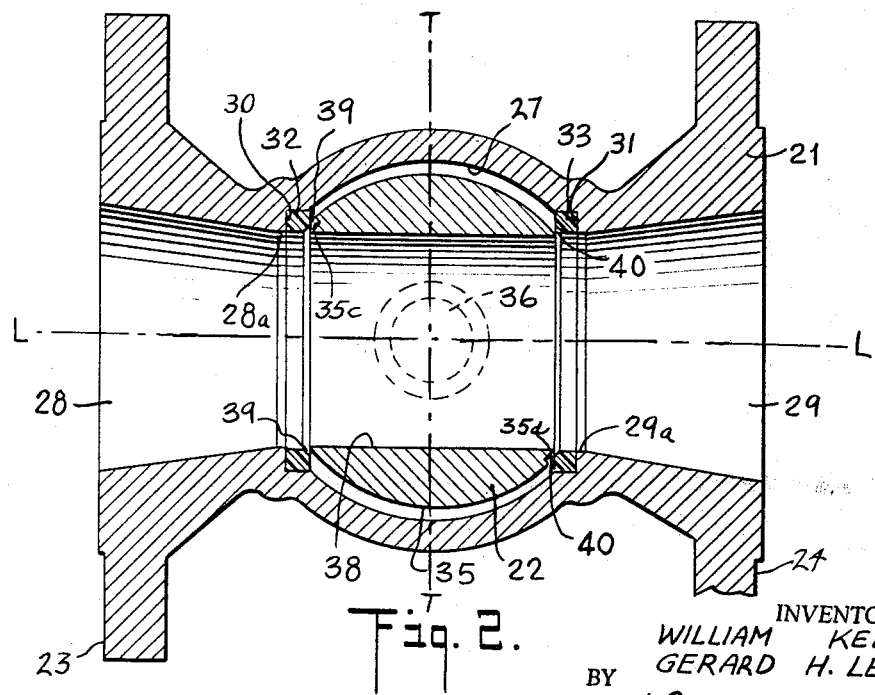
INVENTORS
WILLIAM KELLY
GERARD H. LEVEY
BY
Lester W. Clark
ATTORNEY

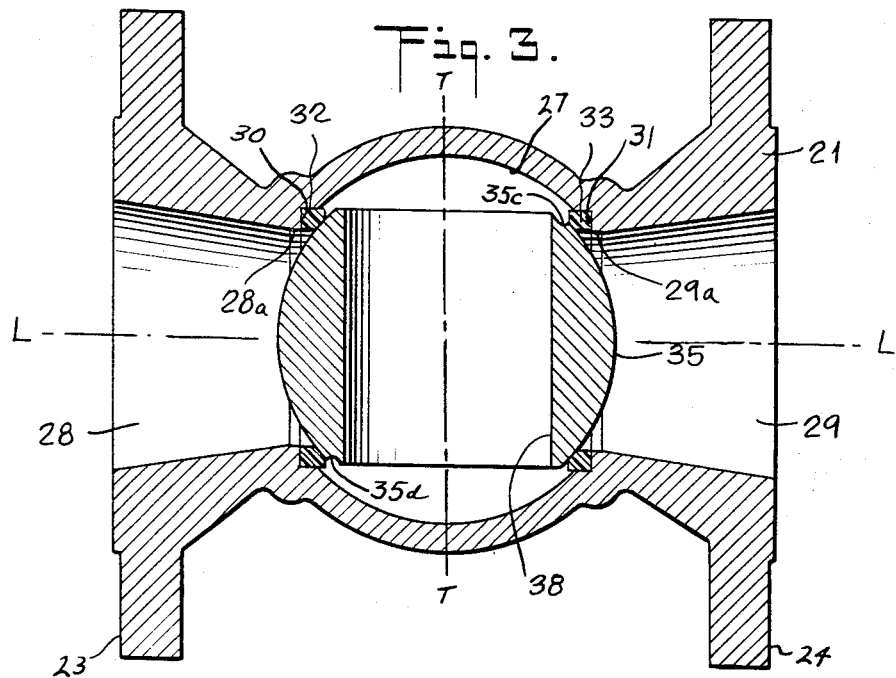

United States Patent Office 3,410,523
Patented Nov. 12, 1968

3,410,523
FLUID VALVE HAVING LOW WEAR AND WEAR-COMPENSATION CHARACTERISTICS
William Kelly, 6930 Snake Road, Oakland, Calif. 94611, and Gerard H. Levey, 148 Hodges Drive, Moraga, Calif. 94556
Filed Oct. 27, 1965, Ser. No. 542,437
14 Claims. (Cl. 251—315)

This invention relates to fluid valves wherein a valve member opens and closes a path of fluid communication by means of a transverse passage therethrough and depending upon the rotational setting thereof, and more particularly relates to such a valve construction embodying superior seating and operating characteristics.

Ball valves form the most common species of valves wherein rotational positioning of a valve member including a transverse passage serves to open and close fluid communication through the valve. Nevertheless, valve members having other outer surfaces of revolution, such as for example the cylinder, the ellipsoid, and the cone, will perform the same action, when provided with a transverse passageway. Throughout this specification and claims, it is to be understood that detailed description of a valve having a generally ball-shaped valve member is by way of illustration only. Valve members having a curved outer surface other than ball-shaped may also be employed. No limitation to ball-shaped members alone is to be inferred.

Heretofore, ball valves have relied upon valve seat members disposed in the passageway through the valve body and resiliently compressed between the valve body and the valve in all positions of the valve, to provide a fluid-tight seal with the ball-shaped valve member when the valve is in a closed position. This common expedient has proven unsatisfactory because every valve movement necessarily wears the seat, so that leakage has invariably resulted at some time during the life of the valve. A number of attempts have been made to overcome this leakage problem by resort to various mechanisms, often including springs and the like, the purpose of which is generally to preclude such leakage through some form of wear compensation at the valve seat members. In general, such devices have been unsatisfactory in performance, have been unduly expensive, or both.

Accordingly, it is an object of the present invention to provide a fluid valve having a rotatable valve member of the type described, wherein seating of the valve member is rendered inherently wear-compensatory due to the construction thereof.

Another object of the invention is to provide such a fluid valve wherein no load is applied to the seats when the valve member is in the open position and only a very light load is applied to the seats when the valve member is in the closed position.

Another object of the invention is to provide such a fluid valve wherein dragging of the valve member across the seat faces is reduced to a very small amount thus reducing seat wear to a corresponding degree.

Another object of the invention is to provide such a fluid valve wherein the aforesaid superior seating characteristics are attained with simplified seat configurations.

Another object of the invention is to provide such a fluid valve wherein simultaneous upstream and downstream sealing is afforded when the valve member is in the closed position.

These and other objects and advantages will appear from the following description and appended claims when read in conjunction with the attached drawings, wherein:

FIG. 1 is a section view through the longitudinal axis of a fluid valve according to the invention showing internal details of construction including a ball-shaped valve member disposed in the closed position;

FIG. 2 is a section view taken along line 2—2 in FIG. 1 showing the relationship between the valve member and the seats therefor when the valve member is arranged in the open position;

FIG. 3 is a section view the same as that shown in FIG. 2 but with the valve member turned to show the relationship between the valve member and the seats therefor when the valve member is arranged in the closed position;

FIG. 4 is a schematic view showing in exaggerated form the relationship between the valve member and the seats therefor in the open position; and FIG. 5 is a schematic view the same as that shown in FIG. 4 but showing the relationship between the valve member and the seats therefor in the closed position.

Referring to the drawings, there is indicated generally at 20 an illustrative embodiment of a fluid valve according to the invention, wherein a ball-shaped valve member is employed to illustrate the inventive principles. Fluid valve 20 comprises, in general, a main housing indicated generally at 21, a ball-shaped valve member indicated generally at 22, and an auxiliary housing indicated generally at 80. The present invention resides in the construction of the curved valve member portion 35 of the valve member 22, and the location and relation of a pair of seats 32a, 33a, with respect to the curved valve member portion 35.

Main housing 21 may be arranged to have any of several well known external configurations, and in the figures main housing 21 is arranged to include spaced flanges 23 and 24, each of which may be connected to other equipment not forming a part of the present invention by means of bolts or the like through circumferentially located bolt holes 25 located in each of flanges 23 and 24, or by other means. Each of flanges 23 and 24 is illustrated as being parallel to one another and as lying in planes perpendicular to the longitudinal axis L—L of the assembly 20. While the main housing 21 need not be essentially symmetrical as shown, it is often desirable to so arrange it, since the invention affords complete symmetry of valving action. Thus a ball valve assembly 20 may be connected into a fluid system without regard to which of flange connection members 23 or 24 is being connected to the upstream or source side.

At the central portion of main housing 21 is a spherical cavity 27 forming a valve member chamber or recess. Spherical cavity 27 communicates with the end of main housing 21 adjacent flange 23 by means of a fluid passageway 28, and communicates with the opposite end of main housing 21 adjacent flange 24 by means of a fluid passageway 29. Each of these fluid passageways is coaxial with longitudinal axis L–L of main housing 21 and is tapered inwardly from a maximum diameter adjacent their respective flanges. Communication at the throats between the spherical cavity 27 of main housing 21 and the respective passageways 38 and 39 is afforded by a pair of short untapered passageway portions 28a and 29a respectively.

Carried within spherical cavity 27 of main housing member 21 is the valve member 22 which includes a generally ball-shaped portion 35, an upper trunnion 36, and a lower trunnion 37. The ball portion 35 is adapted to be rotated about the axis of symmetry V—V thereof, which in the embodiment shown is the vertical axis of the ball valve assembly 20 through trunnions 36, 37. A fluid passage 38 extends transversely through ball portion 35, and in the well known ball valve fashion, connects fluid passageways 28 and 29 when disposed in the open position (FIG. 2) and disconnects fluid passageways 28 and 29 when disposed in the closed position (FIG. 3). The fluid valve according to the invention may be full-port or restricted-port. The diameter of ball passage 38 in the illustrated embodiment is equal to or slightly greater than the diameter of fluid passageway portions 28a, 29a, to render the fluid valve full-port.

Immediately at the terminus of each of passageway portions 28a and 29a, i.e. at the respective throats thereof, is an annular shoulder 30, 31, constituting a retaining means. Retained within each of annular shoulders 30, 31, is an annular valve seat member 32, 33, respectively. As is shown in FIGS. 1 through 3, the shoulders 30, 31, and the seat members 32, 33, are so proportioned that seat members 32, 33, do not intrude upon passageways 28, 29.

As will be explained hereinbelow, the invention contemplates that the valve seat faces 32a, 33a, are not coaxial with axis L—L, and that the generally ball-shaped portion 35 of valve member 22 is not a true spherical surface of revolution. Rather, the valve seat faces 32a, 33a (and in the illustrated embodiment, the entire retaining means 30, 31 and valve seat members 32, 33) are offset to either side of axis L—L to cooperate with opposed eccentric curved portions of generally ball-shaped portion 35 of valve member 22. The degree of eccentricity of ball-shaped portion 35 is very slight, and the degree of offset of valve seat faces 32a, 33a, from axis L—L is also very slight. Accordingly reference is made to diagrammatic FIGS. 4 and 5 for the following discussion of the particulars of the construction of generally ball-shaped portion 35 and the relation thereof to valve seat faces 32a, 33a. The generally ball-shaped portion 35 and seat faces 32a, 33a, shown in FIGS. 4 and 5 do not represent an actual construction of the corresponding parts shown in FIGS. 1–3, but rather include exaggerated proportions in order to illustrate the principles of the construction shown in FIGS. 1–3. The features which will be described with reference to diagrammatic FIGS. 4 and 5 each appear in the actual construction of the ball valve assembly 20 shown in FIGS. 1–3, and certain features will be more clearly identifiable in FIGS. 1–3 upon description thereof with reference to FIGS. 4 and 5.

Referring to FIGS. 4 and 5, valve member 35 comprises a pair of opposed outwardly curved lateral portions 35a and 35b eccentrically positioned outwardly relative to the axis of rotation of valve member 35. In the illustrative embodiment, the axis of rotation of valve member 35 coincides, as aforesaid, with the vertical axis V—V (FIGS. 1–3) of the fluid valve 20, and longitudinal axis L—L, transverse axis T—T, and vertical axis V—V, have a mutually orthogonal intersection shown in FIGS. 4 and 5 as center 41. In the embodiment shown, wherein valve member portion 35 is generally ball-shaped, each of outwardly curved lateral portions 35a and 35b comprises a spherical outline, with reference respectively to centers 43 and 44, which centers are spaced from the axis of rotation V—V of valve member 35, so that the respective centers 43 and 44 lie on either side of center 41. Centers 43 and 44 are spaced on a diagonal to the longitudinal axis of passage 38 through center 41, and are coplanar with center 41, in the illustrated embodiment. Additionally, centers 43 and 44 lie in opposed ones of the four quadrants about center 41 defined by the effective cylindrical axis of passage 38 through center 41 and the perpendiculars thereto at center 41. This spacing of centers 43 and 44 from the axis of rotation V—V which passes through center 41 provides the eccentric aspect of each of outwardly curved portions 35a and 35b, so that the faces of portions 35a and 35b are spherical in outline but are eccentric with respect to center 41. When centers 43 and 44 lie in the opposed quadrants illustrated, valve member 22 with generally ball-shaped portion 35 is turned clockwise to close (as viewed in FIGS. 4 and 5). When centers 43 and 44 are in the other two opposed quadrants, the valve is turned counterclockwise to close.

In FIGS. 4 and 5 the displacement of centers 43 and 44 is exaggerated for clarity, but in reality this displacement is very small. By way of example only, in a generally ball-shaped portion 35 having an effective outside diameter of 4.460 inches the displacement of each of centers 43 and 44 from center 41 is about 0.03 inch, i.e. about 0.02 inch displacement from each of the lines through center 41 defining the quadrant in which that center 43 or 44 lies.

As is best shown in FIGS. 4 and 5, a pair of valve seat faces 32a and 33a, associated respectively with passageways 28 and 29 at spherical cavity 27, is provided on either side of the generally ball-shaped portion 35 of valve member 22. Each of valve seat faces 32a and 33a has an outline normally shaped as a closed curve normally contactable about its entire periphery by a surface having the curvature of the outer surface of one of said outwardly curved lateral portions 35a and 35b. In the embodiment shown, the valve seat members 32 and 33 are each ring-shaped, i.e. are each a circular cylindrical annulus, as aforesaid, and valve seat faces 32a and 33a are spherical so as to mate in the aforesaid fashion with, respectively, the outer surfaces of outwardly curved lateral portions 35b and 35a of valve member 35. It is to be understood that valve seat faces 32a and 33a could be conical in outline, or could take other forms on the inner diameter of valve seat members 32, 33, sufficient to seat in the aforesaid manner against portions 35b and 35a.

Each of valve seat faces 32a and 33a is arranged at an offset position so that the axis A—A through the center of area thereof is laterally spaced from intersection with the axis of rotation V—V through center 41 of valve member 22. This is illustrated in FIGS. 4 and 5 by the offset position of center of area axis A from axis L—L which passes through center 41. As illustrated, the offset of each of axes A—A is in mutually opposite directions each to the other, such that the axis A—A of valve seat face 32a is offset on one side of axis L—L, while the axis A—A of valve seat face 33a is offset on the other side of axis L—L.

It is to be understood that valve seat members 32 or 33 may or may not themselves be offset from axis L—L, it being essential only that their respective valve seat faces 32a and 33a be so offset. However, in order to employ fully symmetrical valve seat members 32 and 33, for the advantage of standardization and economy, the entire valve seat member 32 or 33 is itself offset so that its associated valve seat face 32a or 32b is offset therewith. In FIGS. 4 and 5 it may be seen that the entire valve seat members 32 and 33 are themselves offset to achieve this desired effect at valve seat faces 32a and 33a respectively. The degree of offset of each of valve seat faces 32a and 33a is chosen to be sufficient to cause the mating outwardly curved lateral portion 35a or 35b to be received flushly in fluid-tight communication when the valve member 35 is rotated to the closed position as illustrated in FIG. 5. Continuing by way of example only, with the aforesaid 4.460 inch diameter ball portion with 0.03 inch spacing from center 43 or 44 to center 41, an offset for each valve seat face 32a or 33a of about 0.02 inch measured from axis A—A to axis L—L, will provide flush seating.

It should be noted that valve seat faces 32a and 33a, or valve seat members 32 and 33, are parallel to each other, and are not skewed with respect to longitudinal axis L—L, as shown by the fact that axes A—A are both parallel to axis L—L. This has further implications of manufacturing economy as will be pointed out below.

Referring now to FIGS. 1–3, it may now be understood that the retaining means for the valve seat members 32, 33, being in the illustrated embodiment annular recessed shoulders 30, 31 respectively, are offset with respect to longitudinal axis L—L. While the valve seat faces 32a, 33a can alone be offset (rendering the valve seat members 32, 33 asymmetrical), the preferred, illustrated embodiment introduces the aforesaid offset by an offset in the counterbore constituting recessed circular shoulders 30, 31. Standard seat members can then be employed, and the seat members can be installed without regard to orientation, except that they must be flushly retained within shoulders 30, 31. Three factors thus render the illustrated form of offsetting highly advantageous: first, the counterbores are parallel one to the other; second, symmetrical valve seat members 32, 33 may be employed; third, there is no positional criticality in installing the valve seat members. Manufacturing and operational economy and simplicity are thus fostered.

As is best shown in FIG. 1, ball portion 35 is located within spherical cavity 27 so that lower trunnion 37 is journalled in a cylindrical seat 90, and upper trunnion 36 protrudes upwardly out of spherical cavity 27 and past circular opening 34 in main housing member 21. Circular opening 34 is large enough to pass seats 32, 33 and valve member 22 therethrough during assembly. Auxiliary housing member 80 comprises a generally circular member 45 having an annular boss 46 disposed to be received by an annular shoulder 47 in main housing member 21. An O-ring 48 is retained between boss 46 and shoulder 47. An annular boss 49 of housing member 22 is disposed to be partially engaged by annular shoulder 50 on the upper portion of generally ball-shaped portion 35 so as to secure the ball portion 35 for rotation about vertical axis V—V.

Central bore 51 in auxiliary housing member 22 is of sufficient diameter to loosely accommodate trunnion 36 of generally ball-shaped portion 35. Counter-bore 52 is coaxial with central bore 51, and an annular sealing member 53 occupies the annular space defined by trunnion 36 and counter-bore 52. This annular sealing member 53 performs the usual function of packing trunnion 36, and may be fabricated in any of the known packing materials. Seal retainer cap 54 is mounted on trunnion 36 and has a depending annular portion 54a adapted to enter the annulus defined by counter-bore 52 and trunnion 36 and to retain annular seal 53 therein. Seal retainer cap 54 may be retained axially on trunnion 36 by a snap ring or cotter pin (not shown) or like devices. The relationship of auxiliary housing member 22 and trunnion 36 is such that trunnion 36 may be rotated by means of handle (not shown) attached to the upper portion 36a of trunnion 36, thus selectively rotating generally ball-shaped portion 35 between the open position shown in FIG. 2 and the closed position shown in FIG. 3.

The effect of employing a valve member portion 35 having opposed eccentric portions 35a and 35b is to provide seating characteristics not heretofore available, or at least not heretofore available in a device of straightforward construction without complicated and unreliable compensatory mechanisms. Reference to FIGS. 2 and 4 will show that in the open position an annular spacing 40 is afforded between ball portion 35 and seat member 33, and an annular spacing 39 is afforded between ball portion 35 and seating member 32. This is a result of the displacement of centers 43 and 44 from the position of center 41, and also is a result of the existence of cut-away portions 35c and 35d, respectively of the high portions of asymmetric portions 35a and 35b.

When valve member portion 35 is turned from the open position shown in FIGS. 2 and 4 to the closed position shown in FIGS. 3 and 5, no dragging of eccentric faces 35a and 35b of valve member portion 35 across the seat member faces 32a and 33a occurs, since the eccentric outline of portions 35a and 35b does not abut the valve faces 33a and 32a until ball portion 35 is turned completely or essentially completely to the closed position shown in FIGS. 3 and 5. A main cause of seat wear in prior-art constructions is that the valve member drags across the seat faces during opening and closing of the valve. Moreover, once abutment is attained in the valve according to the invention, further turning in the same direction of ball portion 35 increases the seating pressure, and increases the seating pressure uniformly around the periphery of both of seating members 32 and 33. This feature is not found in prior art ball-type valves.

A particularly important feature of the arrangement is that as wear occurs at seating faces 33a and 32a, compensation is automatically afforded by a slight further turn of ball portion 35 to attain the fully closed position. Thus the eccentric portions 35a and 35b can compensate for wear of seating faces 33a and 32a by simply being rotationally advanced slightly further than before such wear occurred. In general, very little wear occurs in the first place with valves according to the invention because of the aforesaid lack of contact between portions 35a, 35b, and seats 32a, 33a, during all but a very small portion of the opening or closing operations. However over a long period of use, wear will accumulate, and then the compensatory effect will assert itself. The combined effect of these two features, is to render the valve practically wear-proof regarding its seats, with respect to the usual valves. It has been found that an advance of between one and three degrees of ball portion 35 past its initial closed position will compensate for wear occurring during a very long period of use.

Thus the novel construction of ball portion 35 reduces the wear of faces 33a and 32a to a very small fraction of that encountered with the ball valves that are dragged across those faces during closing, and moreover automatically compensates for any wear that does occur due to the inherent action whereby a slightly greater degree of turn will give the same seating action despite any wear. This is an entirely new feature in this art, and is attained with great manufacturing economy and without complicated compensatory mechanisms.

The arrangement is such that fluid flow in either direction, i.e. either from flange 23 to flange 24 or vice-versa can be accommodated. That is to say, the action of valve member portion 35 is symmetrical so that there is no necessary upstream and downstream side thereof. Since the asymmetric portions 35a and 35b do not rest upon or in any way touch the seat members 32 and 33 when the valve is in the open position shown in FIGS. 3 and 4, there is no change of relationship of the parts or any structural effect (e.g. on the seats) due to continued fluid flow therethrough. Any loading on the seats in the closed position, e.g. by pressure from the upstream side on the valve member portion 35, is compensated for in the next closing. That is, if a downstream seat face is compressed, in the next closing the cam action of the eccentric portion of member 35 will adjust to its new outline. This is true even when upstream and downstream sides are reversed. This is another new feature in this art.

It will be apperciated that the same degree of seating may be attained every time with the present construction merely by turning valve member potrion 35 (by the handle) until a fixed amount of closing torque is reflected at trunnion portion 36a through the handle thereof. Moreover this seating force can be very light because it is inherently gradually applied by the asymmetric portions 35a and 35b. Thus, from the standpoint of the operator, the handle is turned the same every time. Any slight wear is automatically compensated by slight extra turning of the handle by an amount that is not apparent to the operator. The fluid valve according to the invention does not leak at the seats thereof for an uncommonly long period of use. If and when wear proceeds beyond the ability of the valve to compensate therefor, seat members 32, 33, can easily be replaced. In replacement, their positioning and their thickness are not critical. It is only necessary that they be flush in shoulders 30, 31. Eccentric portions 35a, 35b will automatically back-off in closing sufficient to accommodate the unworn seat faces 32a, 33a.

The present invention, as has been mentioned, applies to fluid valves having valve member portions 35 in the shape of other than the general ball-shape. Other outwardly curved surfaces (such as surfaces of revolution) may be employed for eccentric faces 35a, 35b. Moreover, it is not necessary that eccentric faces 35a, 35b include as much of the full surface as is illustrated in the figures. Only a portion of the full surface large enough to cover each of valve seat faces 32a, 33a is necessary.

The invention has been described with respect to an illustrative embodiment, but is not limited thereto. As will be apparent to those skilled in the art, the arrangement of valve seat faces 32a, 33a to eccentric portions 35a, 35b may be applied to other forms of fluid valves wherein a rotatable valve member selectively aligns a passage (such as 38) with passageways (such as 28, 29) without departing from the inventive principles. All such variations are contemplated as being within the claimed invention.

What is claimed is:
1. A fluid valve comprising:
 (a) a housing having
  (i) spaced fluid passageways, and
  (ii) a cavity communicating with said passageways;
 (b) a valve member disposed for rotation about a valve member axis of rotation within said cavity, having
  (i) opposed outwardly curved lateral portions thereof eccentrically positioned outwardly relative to said axis of rotation, and
  (ii) a passage therethrough for selective connection and disconnection of said passageways in first and second rotational positions thereof, respectively; and
 (c) a pair of valve seat faces, each associated with a a respective one of said passageways at said cavity, each having
  (i) an outline normally shaped as a closed curve normally contactable about its entire periphery by a surface having the curvature of one of said face portions, and
  (ii) an offset position so that the axis through the center of area thereof is laterally spaced from intersection with said valve member axis of rotation, the offset of each being in the opposite direction to the other, the degree of offset being sufficient to cause one of said face portions to be received flushly in fluid-tight communication when said valve member is disposed in said second position.

2. A fluid valve comprising:
 (a) a housing having
  (i) spaced fluid passageways, and
  (ii) a cavity communicating with said passageways;
 (b) a valve member disposed for rotation about a valve member axis of rotation within said cavity, having
  (i) opposed lateral portions thereof in the form of surfaces of revolution eccentrically positioned outwardly relative to said axis, and
  (ii) a passage therethrough for selective connection and disconnection of said passageways in first and second rotational positions thereof, respectively; and
 (c) a pair of valve seat faces, each associated with a respective one of said passageways at said cavity, each having
  (i) an outline normally shaped as a closed curve normally contactable about its entire periphery by a surface having the curvature of one of said face portions, and
  (ii) an offset position so that the axis through the center of area thereof is laterally spaced from intersection with said valve member axis of rotation, the offset of each being in the opposite direction to the other, the degree of offset being sufficient to cause one of said face portions to be received flushly in fluid-tight communication when said valve member is disposed in said second position.

3. A fluid valve according to claim 2 wherein said opposed lateral valve member portions are each in the form of at least a portion of the surface of a sphere.

4. A fluid valve according to claim 2 wherein said fluid passageways have a common axis at their entrance to said cavity, said valve seats being perpendicular to and offset on a different side of said common axis; and wherein said opposed lateral valve member portions are each in the form of at least a portion of the surface of a sphere.

5. A fluid valve comprising:
 (a) a housing having
  (i) spaced fluid passageways, and
  (ii) a cavity communicating with said passageways;
 (b) a valve member disposed for rotation about a valve member axis of rotation within said cavity, having
  (i) a passage therethrough for selective connection and disconnection of said passageways, respectively in first and second rotational positions thereof, the axis of said passage and a line perpendicular thereto through said axis of rotation defining four quadrants around said axis of rotation, and
  (ii) opposed outwardly curved face portions, each having a center of curvature spaced from said axis on a different side thereof so that such centers of curvature lie in opposed ones of said four quadrants,
 (c) a pair of valve seat faces, each associated with a respective one of said passageways at said cavity, each having
  (i) an outline normally shaped as a closed curve normally contactable about its entire periphery by a surface having the curvature of one of said face portions, and
  (ii) an offset position so that the axis through the center of area thereof is laterally spaced from intersection with said valve member axis of rotation, the offset of each being in the opposite direction to the other, the degree of offset being sufficient to cause one of said face portions to be received flushly by each in fluid-tight communication when said valve member is disposed in said second position.

6. A fluid valve comprising:
 (a) a housing having
  (i) spaced fluid passageways, and
  (ii) a cavity communicating with said passageways;
 (b) a valve member disposed for rotation about a valve member axis of rotation within said cavity, having
  (i) a passage therethrough for selective connection and disconnection of said passageways, respectively in first and second rotational positions thereof, the axis of said passage and a line perpendicular thereto through said axis of rotation defining four quadrants around said axis of rotation, and
  (ii) opposed outwardly curved spherical face portions, each having a center of curvature spaced from said axis on a different side thereof so that each of the pair of such centers of curvature lie in opposed ones of said four quadrants,
 (c) a pair of valve seat faces, each associated with a respective one of said passageways at said cavity, each having
  (i) an outline normally shaped as a closed curve normally contactable about its entire periphery by a surface having the curvature of one of said face portions, and
  (ii) an offset position so that the axis through the center of area thereof is laterally spaced from intersection with said valve member axis of rotation, the offset of each being in the opposite direction to the other, the degree of offset being sufficient to cause one of said face portions to be received flushly by each in fluid-tight communication when said valve member is disposed in said second position.

7. A fluid valve comprising:
(a) a housing having
 (i) spaced fluid passageways, and
 (ii) a cavity communicating with said passageways;
(b) a valve member disposed for rotation about a valve member axis of rotation within said cavity, having
 (i) a passage therethrough for selective connection and disconnection of said passageways, respectively in first and second rotational positions thereof, the axis of said passage being transverse to and intersecting said axis of rotation, and
 (ii) opposed outwardly curved spherical face portions, each having a center of curvature spaced diagonally from said axis of rotation with respect to the longitudinal axis of said passage, and so that each of the pair of such centers of curvature lie on opposite sides of said axis of rotation,
(c) a pair of valve seat faces, each associated with a respective one of said passageways at said cavity, each having
 (i) a normally circular outline normally contactable about its entire periphery by a spherical surface having the curvature of one of said spherical face portions, and
 (ii) an offset position so that the axis through the center of area thereof is laterally spaced from intersection with said valve member axis of rotation, the offset of each being in the opposite direction to the other, the degree of offset being sufficient to cause one of said face portions to be received flushly by each in fluid-tight communication when said valve member is disposed in said second position.

8. A fluid valve comprising:
(a) a housing having
 (i) spaced fluid passageways, and
 (ii) a cavity communicating with said passageways;
(b) a valve member disposed for rotation about a valve member axis of rotation within said cavity, having
 (i) a passage therethrough for selective connection and disconnection of said passageways, respectively in first and second rotational positions thereof, the axis of said passage and a line perpendicular thereto through said axis of rotation defining four quadrants around said axis of rotation, and
 (ii) opposed outwardly curved spherical face portions, each having a center of curvature spaced from said axis on a different side thereof so that each of the pair of such centers of curvature lie in opposed ones of said four quadrants,
(c) a pair of valve seat members, each associated with a respective one of said passageways at said cavity, each having
 (i) a normally circular ring-shaped outline,
 (ii) a seat face formed on the inner diameter of said ring-shaped outline, contactable about its entire periphery by a spherical surface having the curvature of one of said spherical face portions, and
 (iii) an offset position so that the circular axis thereof is laterally spaced from intersection with said valve member axis of rotation, the offset of each being in the opposite direction to the other, the degree of offset being sufficient to cause one of said face portions to be received by each flushly in fluid-tight communication when said valve member is disposed in said second position.

9. A fluid valve comprising:
(a) a housing having
 (i) spaced fluid passageways, arranged in opposition to each other,
 (ii) a cavity between and communicating with said passageways, said cavity defining a throat at the intersection with each said passageway, and
 (iii) circular retaining means located at each said throat, the axis of each retaining means being parallel and spaced laterally from the axis of the associated throat, the pair of retaining means being spaced lateraly in mutually opposite directions.
(b) a valve member disposed for rotation about a valve member axis of rotation within said cavity, having
 (i) a passage therethrough for selective connection and disconnection of said passageways, respectively in first and second rotational positions thereof, the axis of said passage and a line perpendicular thereto through said axis of rotation defining four quadrants around said axis of rotation, and
 (ii) opposed outwardly curved face portions, each having a center of curvature spaced from said axis on a different side thereof so that such centers of curvature lie in opposed ones of said four quadrants,
(c) a pair of valve seat faces, each positioned by a respective one of said retaining means at said cavity, each having
 (i) an outline normally shaped as a closed curve normally contactable about its entire periphery by a surface having the curvature of one of said face portions, and
 (ii) an offset position relative to said valve member axis of rotation, corresponding to the position of the retaining means associated therewith, the degree of offset being sufficient to cause one of said face portions to be received flushly by each in fluid-tight communication when said valve member is disposed in said second position.

10. A fluid valve comprising:
(a) a housing having
 (i) spaced fluid passageways, arranged in opposition to each other,
 (ii) a cavity between and communicating with said passageways, said cavity defining a throat at the intersection with each said passageway, and
 (iii) circular retaining means located at each said throat, the axis of each retaining means being parallel and spaced laterally from the axis of the associated throat, the pair of retaining means being spaced laterally in mutually opposite directions,
(b) a valve member disposed for rotation about a valve member axis of rotation within said cavity, having
 (i) a passage therethrough for selective connection and disconnection of said passageways, respectively in first and second rotational positions thereof, the axis of said passage and a line perpendicular thereto through said axis of rotation defining four quadrants around said axis of rotation, and
 (ii) opposed outwardly curved spherical face portions, each having a center of curvature spaced from said axis on a different side thereof so that each of the pair of such centers of curvature lie in opposed ones of said four quadrants, (c) a pair of valve seat faces, each positioned by a respective one of said retaining means at said cavity, each having (i) a normally circular outline normally contactable about its entire periphery by a spherical surface having the curvature of one of said spherical face portions, and (ii) an offset position relative to said valve member axis of rotation, corresponding to the position of the retaining means associated therewith, the degree of offset being sufficient to cause one of said face portions to be received flushly by each in fluid-tight communication when said valve member is disposed in said second position.

11. A fluid valve comprising:
(a) a housing having
(i) spaced fluid passageways, arranged in opposition to each other,
(ii) a cavity between and communicating with said passageways, said cavity defining a throat at the intersection with each said passageway, and
(iii) means defining a circular recessed shoulder located at each said throat, the axis of each recessed shoulder being parallel and spaced laterally from the axis of the associated throat, the pair of recessed shoulders being spaced laterally in mutually opposite directions, (b) a valve member disposed for rotation about a valve member axis of rotation within said cavity, having
(i) a passage therethrough for selective connection and disconnection of said passageways, respectively in first and second rotational positions thereof, the axis of said passage and a line perpendicular thereto through said axis of rotation defining four quadrants around said axis of rotation, and
(ii) opposed outwardly curved spherical face portions, each having a center of curvature spaced from said axis on a different side thereof so that each of the pair of such centers of curvature lie in opposed ones of said four quadrants, (c) a pair of valve seat members, each positioned within a respective one of said recessed shoulders at said cavity, each having
(i) a normally circular ring-shaped outline,
(ii) a seat face formed on the inner diameter of said ring-shaped outline, contactable about its entire periphery by a spherical surface having the curvature of one of said spherical face portions, and
(iii) an offset position relative to said valve member axis of rotation, corresponding to the position of the recessed shoulder associated therewith, the degree of offset being sufficient to cause one of said face portions to be received flushly by each in fluid-tight communication when said valve member is disposed in said second position.

12. A fluid valve comprising:
(a) a housing having
(i) spaced fluid passageways, arranged in opposition to each other,
(ii) a cavity between and communicating with said passageways, said cavity defining a throat at the intersection with each said passageway, the pair of said throats having a common axis, and
(iii) circular retaining means located at each said throat, the axis of each retaining means being parallel and spaced laterally from said common axis of the opposed pair of throats, the pair of retaining means being spaced laterally in mutually opposite directions, (b) a valve member disposed for rotation about a valve member axis of rotation within said cavity, having
(i) a passage therethrough for selective connection and disconnection of said passageways, respectively in first and second rotational positions thereof, the axis of said passage being transverse to and intersecting said axis of rotation, and
(ii) opposed outwardly curved spherical face portions, each having a center of curvature spaced diagonally from said axis of rotation with respect to the longitudinal axis of said passage, and so that each of the pair of such centers of curvature lie on opposite sides of said axis of rotation, (c) a pair of valve seat members, each positioned by a respective one of said retaining means at said cavity, each having
(i) a normally circular ring-shaped outline,
(ii) a seat face formed on the inner diameter of said ring-shaped outline, contactable about its entire periphery by a spherical surface having the curvature of one of said spherical face portions, and
(iii) an offset position relative to said valve member axis of rotation, corresponding to the position of the retaining means associated therewith, the degree of offset being sufficient to cause one of said face portions to be received flushly by each in fluid-tight communication when said valve member is disposed in said second position.

13. A fluid valve according to claim 12 wherein each said seat face comprises a beveled edge at the inner diameter of the associated valve seat member.

14. A fluid valve according to claim 12 wherein said circular retaining means each comprise a recessed shoulder and wherein each said seat face comprises a beveled edge at the inner diameter of the associated valve seat member.

References Cited

| | | | |
|---|---|---|---|
| 125,792 | 4/1872 | Crassley | 251—163 |
| 2,306,839 | 12/1942 | Volpin | 251—163 |
| 2,765,142 | 10/1956 | Ludeman | 251—162 |

FOREIGN PATENTS 45,934   1/1936   France.

M. CARY NELSON, *Primary Examiner.*

M. O. STURM, *Assistant Examiner.*